2,831,887

ARALKOXYNAPHTHALENE DERIVATIVES

Raymond M. Dodson, Park Ridge, and Paul B. Sollman, Evanston, Ill., assignors, by mesne assignments, to G. D. Searle & Co., Skokie, Ill., a corporation of Delaware No Drawing. Application November 30, 1953
Serial No. 395,286

3 Claims. (Cl. 260—520)

The present invention relates to a new group of derivatives of aralkoxynaphthalenes and, more particularly, to their carboxyalkyl and hydroxyalkyl derivatives. The compounds of our invention can be represented by the general structural formula

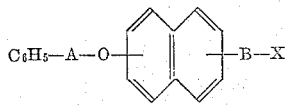

wherein A and B are lower alkylene groups and X is a carbinol or a carboxy group. The radical A is a lower alkylene radical such as methylene, ethylene, proylene, trimethylene, tetramethylene, and the like. The radical B is likewise a lower alkylene radical; of special value for the purposes of our invention are compounds wherein B represents a highly branched alkylene radical such as dimethylbutylene, diethylbutylene, dimethylpentylene, diethylpentylene, methylhexylene and the like.

The compounds of our invention furnish valuable medicinal agents, particularly useful in degenerative diseases associated with abnormal cholesterol metabolism. While they produce little or no estrogenic, androgenic and anabolic side reactions, they depress the serum concentration of cholesterol and of low density lipid and lipoprotein components floating at rates of 10 to 30 negative Svedberg units ($S_f$). These compounds also serve as valuable intermediates in the synthesis of other medicinal products and particularly of cardiovascular agents with minimal side effects. Thus, the claimed acids can be esterified to yield lower alkyl esters, lower aralkyl esters, and lower cycloalkylalkyl esters. The claimed alcohols can be esterified with acid halides of lower alkanoic acids, aromatic acids, and cycloalkyl-alkanoic acid. Likewise, these claimed alcohols can be etherified by conventional methods to yield the lower alkyl and aralkyl ethers.

The following examples illustrate in further detail the compounds which constitute our invention and methods for their production. However, the invention is not to be construed as limited by the details set forth in spirit or in scope. It will be apparent to those skilled in the art that many modifications in materials and methods can be practiced without departing from the invention. In each of these examples, temperatures are given in degrees centigrade (° C.) and relative amounts of materials in parts by weight.

Example 1

To a solution of 95 parts of 2,2-dimethyl-3-(6'-hydroxy-2'-naphthyl)valeric acid and 57.5 parts of pellets containing 85% potassium hydroxide in 1400 parts of absolute ethanol are added 253 parts of α-chlorotoluene. The solution is refluxed for 3 hours. The precipitated potassium chloride is collected on a filter and washed with 800 parts of ethanol. The washing liquor is combined with the filtrate. On standing, there separates a precipitate of the benzyl ester of 2,2-dimethyl-3-(6'-benzyloxy-2'-naphthyl)valeric acid melting at about 104–108° C. The mother liquor is concentrated under vacuum and then neutralized and submitted to steam distillation to yield an additional crop of the ester which is recrystallized from ethanol. By repeated ethanol recrystallization, the melting point is raised to about 110–112° C. The compound has the structural formula

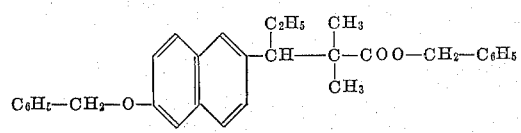

Example 2

43 parts of the benzyl ester of 2,2-dimethyl-3-(6'-benzyloxy-2'-naphthyl)valeric acid are refluxed for 16 hours with a mixture of 1200 parts of ethanol, 100 parts of water and 150 parts of potassium hydroxide pellets. The solvent is removed by vacuum distillation and the residue is treated with 3000 parts of water. The insoluble potassium salt is collected on a filter and then dissolved in a mixture of 550 parts of ethanol and 1000 parts of water. This solution is acidified by addition of 12 parts of concentrated hydrochloric acid and diluted with 3000 parts of water. The precipitate is collected on a filter and recrystallized from aqueous acetic acid and then from benzene. The 2,2-dimethyl-3-(6'-benzyloxy-2'-naphthyl)-valeric acid thus obtained melts at about 183–185° C.

Example 3

To a solution of 57 parts of lithium aluminum hydride in 715 parts of ether is added a solution of 45 parts of 2,2-dimethyl-3-(6'-benzyloxy-2'-naphthyl)valeric acid in 2200 parts of ether. The solution is refluxed for 22 hours. Then 450 parts of ethyl acetate are added portionwise followed by 900 parts of water. There occurs a precipitation of inorganic solid. The supernatant liquid is separated and evaporated under vacuum. The residue is crystallized from low-boiling petroleum ether. The 2,2-dimethyl-3-(6'-benzyloxy-2'-naphthyl)pentanol thus obtained melts at about 121–123° C.

We claim:

1. A compound of the structural formula

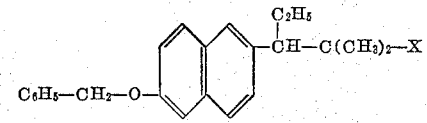

wherein X is a member of the class consisting of $CH_2OH$ and $COOH$ radicals.

2.

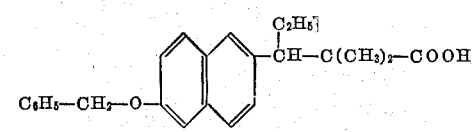

3.

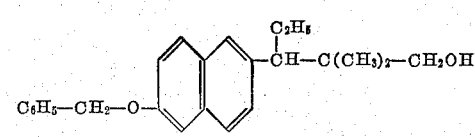

References Cited in the file of this patent

UNITED STATES PATENTS

| | | |
|---|---|---|
| 2,542,937 | Miescher et al. | Feb. 20, 1951 |
| 2,547,123 | Horeau et al. | Apr. 3, 1951 |